Patented Feb. 4, 1941

2,230,696

UNITED STATES PATENT OFFICE 2,230,696

AZO DYESTUFFS

Siegfried Petersen, Cologne-Mulheim, Germany, assignor to General Aniline & Film Corporation, a corporation of Delaware No Drawing. Application August 15, 1939, Serial No. 290,219. In Germany September 19, 1938

4 Claims. (Cl. 260—160)

The present invention relates to new valuable azo-dyestuffs being capable of forming metal complex compounds; more particularly it relates to azodyestuffs of the following formula

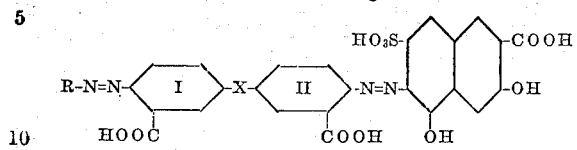

In this formula X stands for a bond directly linking two carbon atoms of the nuclei I and II or the bivalent bridge radical —NH.CO.HN—, and R stands for a radical of a compound containing a methylene group capable of coupling.

My new dyestuffs are obtainable by combining 1 molecular proportion of tetrazotized 4.4'-diaminodiphenyl-3.3'-dicarboxylic acid or 4.4'-diaminodiphenylurea-3.3'-dicarboxylic acid with 1 molecular proportion of a compound containing a methylene group capable of coupling and with 1 molecular proportion of 2.8-dihydroxynaphthalene-3-carboxylic acid-6-sulfonic acid.

As compounds containing a methylene group capable of coupling may be used, for instance, 1-phenyl-3-methyl-5-pyrazolone and its derivatives substituted in the phenyl radical, 1-phenyl-5-pyrazolone-3-carboxylic acid, 1-phenyl-3-methyl-5-iminopyrazole, dihydroresorcinol, acetoacetarylides and the derivatives thereof substituted in the aryl nucleus.

The dyestuffs thus obtained dye cotton and regenerated cellulose currant-brown to currant-red shades. When these dyeings are aftertreated on the fiber with agents yielding metal, especially with agents yielding copper the shades change to black-brown and the dyeings become very fast to water, washing and light.

The following examples illustrate my invention without, however, restricting it thereto the parts being by weight.

Example 1

272 parts of 4.4'-diaminodiphenyl-3.3'-dicarboxylic acid are dissolved in water to an alkaline solution. Thereto 175 parts of sodium nitrite are added and the solution is acidified at low temperature with 800 parts of hydrochloric acid ($d=1,18$). The clear diazo solution thus obtained is freed after some time from excess nitrous acid by means of aminosulfonic acid and the acid reaction is neutralized to an acetic reaction by adding sodium acetate. Thereupon a solution of 174 parts of 1-phenyl-3-methyl-5-pyrazolone in 1400 parts of alcohol is slowly added. The orange colored coupling product which soon precipitates, is isolated after 3 hours, slurried and slowly added to a sodium carbonate to sodium hydroxide alkaline solution of 284 parts of 2,8-dihydroxynaphthalene-3-carboxylic acid-6-sulfonic acid. The coupling is completed after 12 hours. The dyestuff is isolated in the usual manner and dried. It corresponds in its free state to the following formula

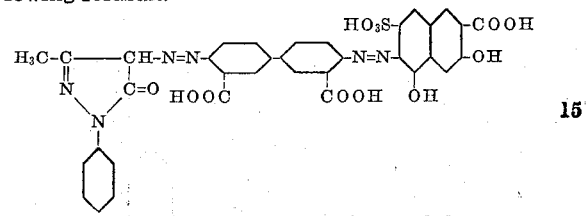

and dyes cotton and regenerated cellulose currant shades which change, when aftertreated with copper salts to black-brown shades of good fastness to washing and light. If the dyeings are after treated with potassium dichromate grey-black shades also of good fastness to washing are obtained.

Example 2

A tetrazo solution obtained in the manner described in Example 1 from 272 parts of 4.4'-diaminodiphenyl-3.3'-dicarboxylic acid is neutralized with sodium bicarbonate to weakly alkaline reaction. To this solution the alcoholic solution of 209 parts of 1-(2'-chlorophenyl)-3-methyl-5-pyrazolone is added. When the coupling is completed the coupling product is isolated and combined in alkaline medium in the presence of pyridine with 284 parts of 2,8-dihydroxy-naphthalene-3-carboxylic acid-6-sulfonic acid. The dyestuff thus obtained corresponds in its free state to the following formula

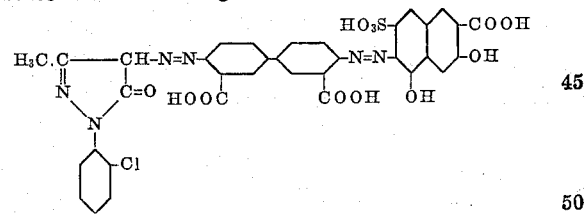

and yields on the fiber when aftertreated with agents yielding copper black-brown shades of good fastness properties.

A similar dyestuff is obtained if instead of 1-(2'-chlorophenyl)-3-methyl-5-pyrazolone 1-

(2',5'-dichlorophenyl)-3-methyl-5-pyrazolone is used.

Example 3

The tetrazo solution prepared from 4.4'-diaminodiphenyl-3.3'-dicarboxylic acid according to Example 1 is neutralized with sodium acetate and an aqueous solution of 276 parts of the sodium salt of 1-(4'-sulfophenyl)-3-methyl-5-pyrazolone are slowly added. When the coupling is finished the solution is rendered weakly alkaline with sodium hydroxide. 284 parts of an alkaline solution of 2.8-dihydroxynaphthalene-3-carboxylic acid-6-sulfonic acid are added and the formation of the dyestuff is completed in the presence of pyridine. The dyestuff corresponds in its free state to the following formula

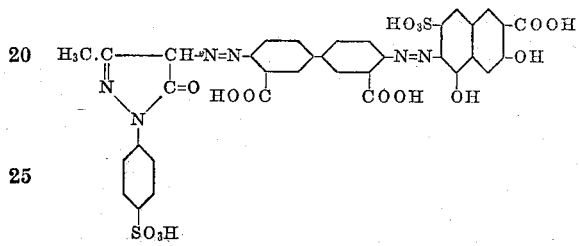

and yields on the cellulosic fibers when aftertreated with agents yielding copper black-brown shades.

If in this example instead of 1-(4'-sulfophenyl)-3-methyl-5-pyrazolone the equivalent quantity of 1-phenyl-5-pyrazolone-3-carboxylic acid is used, a metallizable dyestuff of similar properties is obtained.

Example 4

272 parts of 4.4'-diaminodiphenyl-3.3'-dicarboxylic acid are tetrazotized as stated in Example 1 and the tetrazo solution is neutralized with sodium acetate. Thereupon the aqueous solution of 344 parts of the sodium salt of 1-aceto-acetamino-2-methoxy-4-chlorobenzene-5-sulfonic acid are slowly added and, when the coupling is completed, the coupling product is combined with 284 parts of 2,8-dihydroxynaphthalene-3-carboxylic acid-6-sulfonic acid in the usual manner. The dyestuff corresponds in its free state to the following formula

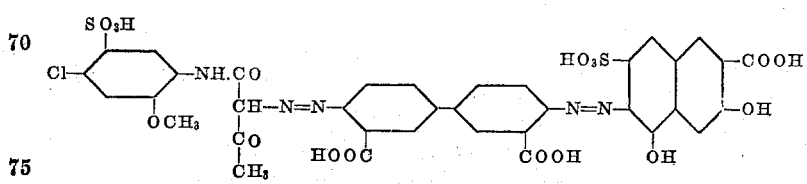

and yields on cotton and regenerated cellulose when after-treated with agents giving off copper olive black-brown shades of good fastness to light and washing. When the dyestuff is aftertreated with chromium salts reddish black-brown shades also of good fastness to washing are obtained.

Example 5

330 parts of 4.4'-diaminodiphenylurea-3.3'-dicarboxylic acid are dissolved to an alkaline solution and after addition of 140 parts of sodium nitrite acidified with hydrochloric acid at low temperature. When the diazotization is completed the solution is neutralized with sodium bicarbonate and an aqueous solution of 276 parts of the sodium salt of 1-(4'-sulfophenyl)-3-methyl-5-pyrazolone are slowly added drop by drop. As soon as the coupling is completed the solution is rendered more alkaline with sodium hydroxide and the second coupling with 284 parts of 2,8-dihydroxynaphthalene-3-carboxylic acid-6-sulfonic acid is carried through. The current colored dyestuff is isolated in the usual manner. It corresponds in its free state to the following formula

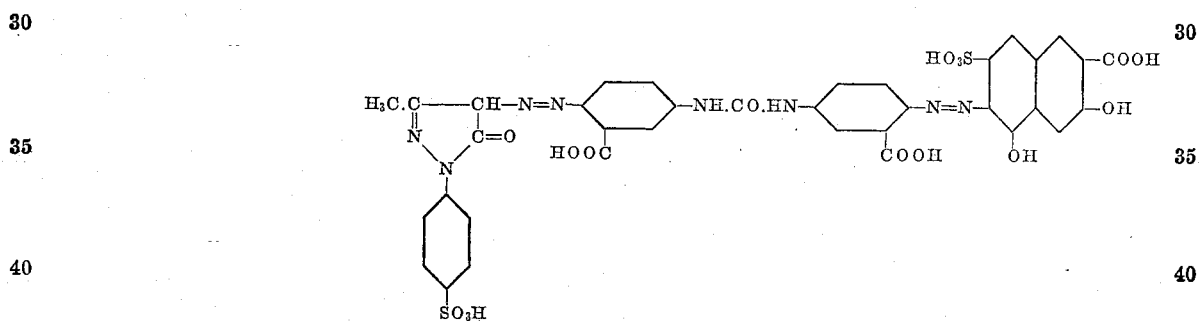

and yields on cellulosic fibers when after treated with coppering agents fast brown shades.

If instead of 1-(4'-sulfophenyl)-3-methyl-5-pyrazolone the 1-phenyl-3-methyl-5-pyrazolone is used, a similar dyestuff is obtained.

Example 6

The tetrazo compound obtained from 272 parts of 4.4'-diaminodiphenyl-3.3'-dicarboxylic acid according to Example 1 is neutralized with sodium acetate and the alcoholic solution of 173 parts of 1-phenyl-3-methyl-5-iminopyrazole is added drop by drop at low temperature. The mixture is stirred for 4 hours, thereupon rendered weakly alkaline by adding sodium carbonate and the separated intermediate is isolated. The slurried orange-red compound is added to the sodium carbonate alkaline solution of 284 parts of 2.8-dihydroxynaphthalene-3-carboxylic acid-6-sulfonic acid. The new dyestuff is isolated as usual. It corresponds in its free state to the following formula:

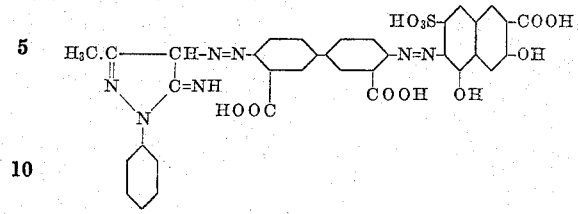

and yields on cotton or regenerated cellulose when aftertreated with agents yielding copper currant-brown shades of good fastness properties.

Example 7

272 parts of 4.4'-diaminodiphenyl-3.3'-dicarboxylic acid are tetrazotized according to Example 1. The acidity of the tetrazo solution is reduced by adding sodium acetate and thereupon 189 parts of 1-(3'-aminophenyl)-3-methyl-5-pyrazolone, dissolved in water and sodium hydroxide, are slowly added. When this coupling is completed the intermediate is isolated and added to the sodium carbonate alkaline solution of 284 parts of 2.8-dihydroxynaphthalene-3-carboxylic acid-6-sulfonic acid. After 12 hours the dyestuff is separated in the usual manner; it is very similar in its properties to the dyestuff obtained according to Example 1. It corresponds in its free state to the following formula

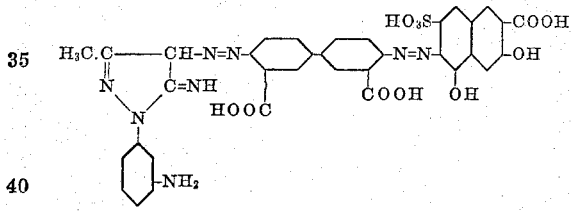

I claim:

1. As new products azodyestuffs of the general formula

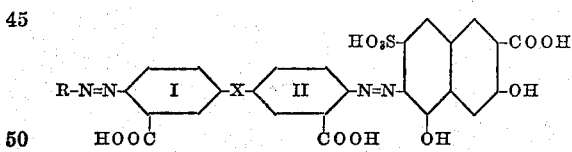

wherein R stands for the radical of a compound containing a methylene group capable of coupling selected from the group consisting of pyrazolones, iminopyrazoles, acetoacetic arylides and dihydroresorcinol, and X stands for a member of the group consisting of a bond directly linking two carbon atoms of the nuclei I and II and the bivalent bridge radical —NH.CO.HN—.

2. As new products azodyestuffs of the general formula

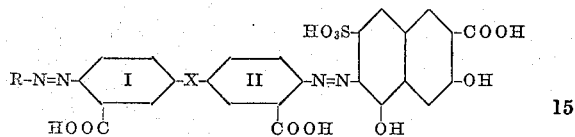

wherein R stands for the radical of a pyrazolone, and X stands for a member of the group consisting of a bond directly linking two carbon atoms of the nuclei I and II and the bivalent bridge radical —NH.CO.HN—.

3. As new products azodyestuffs of the general formula

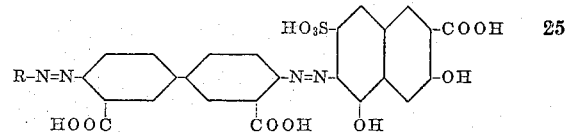

wherein R stands for the radical of a pyrazolone.

4. As a new product the azodyestuff corresponding in its free state to the formula

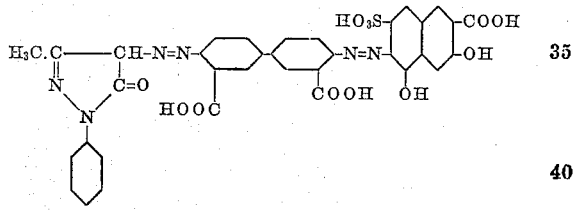

and dyeing cotton and regenerated cellulose currant shades which change, when aftertreated with copper salts, to black-brown shades of good fastness to washing and light.

SIEGFRIED PETERSEN.